United States Patent
MacMillan et al.

(10) Patent No.: US 8,868,908 B2
(45) Date of Patent: Oct. 21, 2014

(54) TOTAL HYPERVISOR ENCRYPTOR

(71) Applicant: Dark Matter Labs Inc., Victoria (CA)

(72) Inventors: Jeffrey Earl MacMillan, Victoria (CA); Jason Arthur Offrey, Riverview (CA)

(73) Assignee: Dark Matter Labs, Inc. (CA)

( * ) Notice: Subject to any disclaimer, the term of this patent is extended or adjusted under 35 U.S.C. 154(b) by 0 days.

(21) Appl. No.: 13/791,742

(22) Filed: Mar. 8, 2013

(65) Prior Publication Data

US 2014/0258716 A1   Sep. 11, 2014

(51) Int. Cl.
  *H04L 29/06* (2006.01)
  *G06F 21/60* (2013.01)
  *G06F 21/70* (2013.01)
  *G06F 21/78* (2013.01)

(52) U.S. Cl.
  CPC .............. *G06F 21/602* (2013.01); *G06F 21/70* (2013.01); *G06F 21/78* (2013.01); *G06F 21/60* (2013.01)
  USPC ........................................................ 713/164

(58) Field of Classification Search
  CPC .......... G06F 21/60; G06F 21/70; G06F 21/78
  USPC ........................................................ 713/164
  See application file for complete search history.

(56) References Cited

U.S. PATENT DOCUMENTS

| | | | |
|---|---|---|---|
| 8,438,609 B2* | 5/2013 | Cohen et al. | 726/1 |
| 2010/0077214 A1* | 3/2010 | Jogand-Coulomb et al. | 713/170 |
| 2011/0202765 A1* | 8/2011 | McGrane et al. | 713/168 |
| 2011/0271279 A1* | 11/2011 | Pate | 718/1 |
| 2013/0091318 A1* | 4/2013 | Bhattacharjee et al. | 711/6 |

* cited by examiner

*Primary Examiner* — Peter Shaw
(74) *Attorney, Agent, or Firm* — John W. Branch; Lowe Graham Jones PLLC

(57) ABSTRACT

Embodiments are directed towards providing cryptographic services to protect guest operating system (OS) images in virtualized computing environments. A hypervisor may trap privileged operations initiated by guest OS images. These trapped operations may be intercepted by a cryptographic module. A hypervisor may trap a write operation made by a guest OS image, and cryptographic module may encrypt the write buffer and return it the hypervisor. A hypervisor may trap a read operation made by a guest OS image, and provide the encrypted data to the cryptographic module for decrypting. If the data is decrypted, the cryptographic module may provide the decrypted data to the hypervisor which provides the decrypted data to the guest OS image. Also, guest OS image context information may be decrypted and encrypted as the guest OS image is scheduled and de-scheduled on physical CPU(s). Further, if necessary entire guest OS images may be encrypted.

21 Claims, 13 Drawing Sheets

TOTAL HYPERVISOR ENCRYPTOR

TECHNICAL FIELD

The present invention relates generally to computer automated cryptography for non-volatile and volatile data and more particularly, but not exclusively to cryptographic operations directed at non-volatile and volatile memory in virtualized computing environments including computing environments where hypervisors may be operative.

BACKGROUND

The growth of the use of virtualized computing environments, including cloud based computing environments, has been driven in part by the convenience of managing, deploying, and accessing virtualized computing resources. In many cases, users may utilize virtualized computing resources that may be owned and/or hosted by a variety of third party vendors. In practice, the convenience afforded by virtualized computing and/or cloud computing may come at the cost of control and security of digital resources. In most cases, users must trust in their cloud computing vendors to maintain internal and external security processes sufficient to protect the software and data owned by the users. In some cases, the users using computing resources in a cloud environment have limited transparency regarding the security precautions that may be provided by a cloud computing vendor. For some users it may be difficult or impossible to rely on distant third parties to provide security for valuable digital and computing resources. Also, concerns about security and cryptography in a cloud based environment may prevent some users who would otherwise prefer the convenience promised by cloud based computing from moving to a cloud computing environment. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein.

DESCRIPTION OF THE VARIOUS EMBODIMENTS

Figure 1:
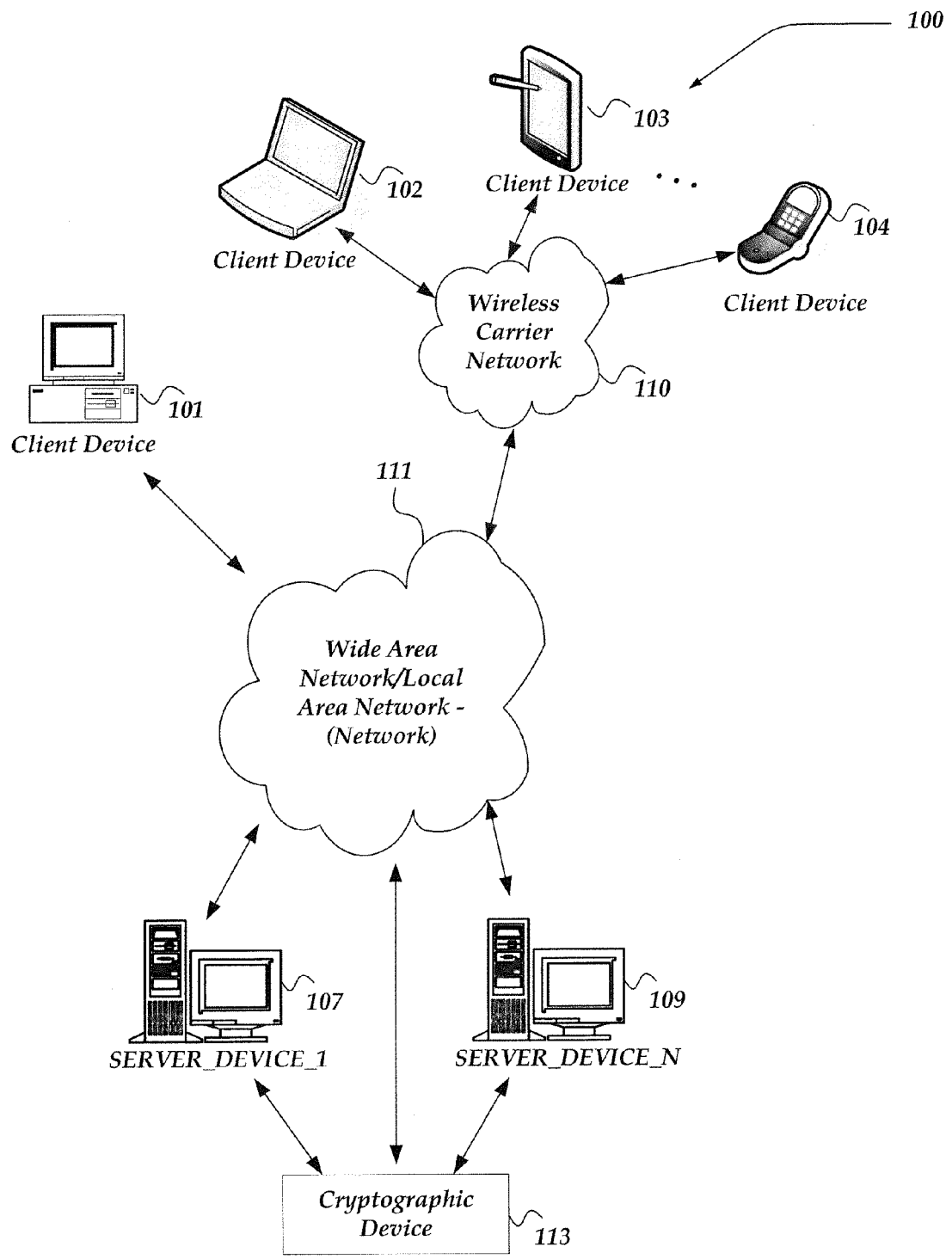
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

The term "guest operating system (OS) image" as used herein refers to a virtualized machine that may be operative in a virtualized computing environment within and/or under the management of a hypervisor.

The term "protected guest OS image," as used herein refers to a guest operating system (OS) image that is designated for protection from tampering and/or unauthorized access. In at least one of the various embodiments, protected guest OS images may be protected using encryption operations and security services that may be provided by a cryptographic module and/or a cryptographic device.

The term "cryptographic service provider," as used herein refers to either cryptographic devices and/or cryptographic web services used to provide cryptographic services. The provided Cryptographic services may be divided among one or more cryptographic service providers.

Briefly stated, various embodiments are directed towards providing cryptographic services that may protect guest operating system (OS) images operating in virtualized computing environments. In at least one of the various embodiments, a hypervisor may trap privileged action initiated by protected guest OS images. These trapped actions may be further intercepted by a cryptographic module.

In at least one of the various embodiments, a hypervisor may trap a write operation made by a protected guest OS image, and may provide the write buffer from the guest OS image to the cryptographic module. In at least one of the various embodiments, the cryptographic module may encrypt the contents of the write buffer and return it the hypervisor. In at least one of the various embodiments, if the write buffer has been encrypted, the hypervisor may store the write buffer to the appropriate storage.

In at least one of the various embodiments, a hypervisor may trap a read operation made by a protected guest OS image, and may load encrypted data from volatile or non-volatile memory sources corresponding to the guest OS image read operation. In at least one of the various embodiments, the hypervisor may provide the encrypted data to the cryptographic module for decrypting. In at least one of the various embodiments, if the data may be decrypted the cryptographic module may provide the decrypted data to the hypervisor which may provide the decrypted data to the guest OS image.

In addition, in at least one of the various embodiments, protected guest OS image context information may be decrypted and encrypted as it may be scheduled and de-scheduled on physical CPU(s).

In at least one of the various embodiments, if a hypervisor may be preparing to schedule a guest OS image for a physical CPU time-slice, the hypervisor may load the stored encrypted context information and provide it to the cryptographic module for decryption. In at least one of the various embodiments, if the protected guest OS image context information may be decrypted the hypervisor may use that context information to restore the protected guest OS image to its last operative state and enable the physical CPU to execute on behalf of the protected guest OS image.

In at least one of the various embodiments, if a hypervisor may be preparing to de-schedule a protected guest OS image off of a physical CPU, the hypervisor may collect the context information of the guest OS image. In at least one of the various embodiments, the collected guest OS image context information may be provided to the cryptographic module encrypted. In at least one of the various embodiments, if the protected guest OS image context information may be encrypted the hypervisor may store the encrypted context information and de-schedule the protected guest OS image off of the physical CPU(s).

Further, in at least one of the various embodiments, protected guest OS image reads that may generate a read memory fault may be trapped by a hypervisor that may load encrypted memory from storage and provide the encrypted memory to a cryptographic module for decryption. In at least one of the various embodiments, the cryptographic module may decrypt the encrypted memory and provide the decrypted memory back to the hypervisor. In at least one of the various embodiments, the hypervisor may then provide the decrypted memory to the guest OS image that caused the initiating read memory fault.

Also, in at least one of the various embodiments, a hypervisor may release portions of the memory used by a protected guest OS image. In at least one of the various embodiments, if the released memory may be dirty (e.g., the contents may have changed since being loaded from storage) the hypervisor may provide the memory to a cryptographic module for encryption. In at least one of the various embodiments, if the cryptographic module encrypts that portion of memory, the encrypted memory may be provided to the hypervisor for saving to storage.

In at least one of the various embodiments, if a cryptographic module receives a request to provide cryptographic services, the cryptographic module may first determine if the requested cryptographic services may be provided using information and/or data that may be stored in a local cache. In at least one of the various embodiments, if the requested services require new and/or additional data to perform the requested services the cryptographic module may make a request to a cryptographic device to obtain the information and/or data for performing the requested services. In at least one of the various embodiments, the data that may be received from the cryptographic device may be stored in a cache accessible to the cryptographic module.

In at least one of the various embodiments, the cryptographic module may use the information from the cache (provided by the cryptographic device) to determine if the requested cryptographic services may be performed. Also, in at least one of the various embodiments, the data may be used to determine the veracity of the requested services. In at least one of the various embodiments, if the request is verified the cryptographic module may perform the requested services.

In at least one of the various embodiments, the cryptographic module may detect and/or be notified if an unprotected guest OS images may be designated to be protected. In at least one of the various embodiments, if the installed guest OS image may be designated as a protected image the cryptographic module may encrypt the guest OS image at the time it is installed.

Illustrative Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client devices 101-104, server devices 1-N 107-109, and cryptographic device 113.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data, including budgeting and forecasting information, between another computing device. The client application may include a capability to provide requests and/or receive data relating to managing, operating, or configuring the cryptographic module and/or cryptographic device 113. In some embodiments, the client application may employ processes such as described below in conjunction with FIGS. 5-13 to perform at least some of its actions.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, servers 107-109, cryptographic device 113, client device(s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 2:
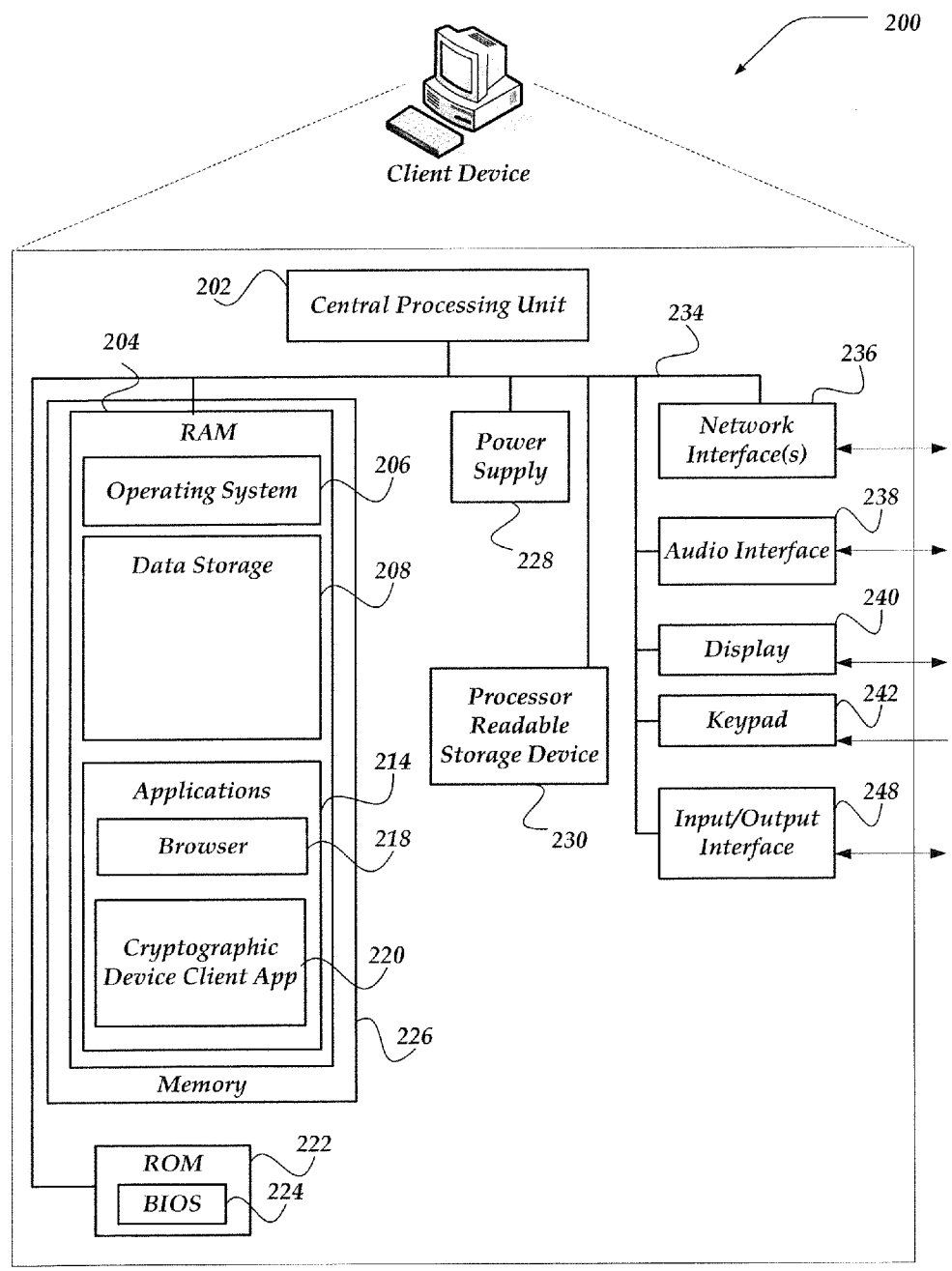
FIG. 2 shows one embodiment of a client device that may be included in a system implementing the invention.

Cryptographic device 113 may include virtually any network device usable to provide cryptographic services, such as network device 200 of FIG. 2. In one embodiment, cryptographic device 113 employs various techniques to encrypt and/or decrypt data and messaging information, including providing encryption/decryption services for servers 107-109. In at least one of the various embodiments, cryptographic device 113 may be operative to provide cryptographic services such as encrypting/decrypting non-volatile and volatile memory associated with guest hosts and guest operating system images operating in virtualized environments, including those that may be operating and/or installed on servers 107-109.

Devices that may operate as cryptographic device 113 include various network devices, including, but not limited to personal computers, desktop computers, multiprocessor systems, microprocessor-based or programmable consumer electronics, network PCs, server devices, network appliances, or the like. It should be noted that while cryptographic device 113 is illustrated as a single network device, the invention is not so limited. Thus, in another embodiment, cryptographic device 113 may represent a plurality of network devices. For example, in one embodiment, cryptographic device 113 may be distributed over a plurality of network devices and/or implemented using cloud architecture.

Moreover, cryptographic device 113 is not limited to a particular configuration. Thus, cryptographic device 113 may operate using a master/slave approach over a plurality of network devices, within a cluster, a peer-to-peer architecture, and/or any of a variety of other architectures. Thus, cryptographic device 113 is not to be construed as being limited to a single environment, and other configurations, and architectures are also envisaged. Cryptographic device 113 may employ processes such as described below in conjunction with FIGS. 5-13 to perform at least some of its actions.

Illustrative Client Device

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, and other storage means. Mass memory 226 illustrates an example of computer readable storage media (devices) for storage of information such as computer readable instructions, data structures, program modules or other data. Read-only memory ("ROM") 222 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, LINUX™, Windows®, Solaris™, or the like, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device (not shown) within client device 200.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and cryptographic device client application 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as service device 107 of FIG. 1. In one embodiment, browser 218 may enable a user to view and/or manipulate cryptographic device configuration features, status reports, administrative functions, or the like.

In at least one of the various embodiments, a user may employ client device 200 to interact and access information stored or otherwise managed using cryptographic device 113. In at least one of the various embodiments, cryptographic device client application 220 may be arranged to enable a user to view and/or manipulate cryptographic device configuration features, status reports, administrative functions, or the like, as further discussed below.

In any event, cryptographic device client application 220 may employ processes similar to those described below in conjunction with FIGS. 5-13 to perform at least some of its actions.

Illustrative Network Device

Figure 3:
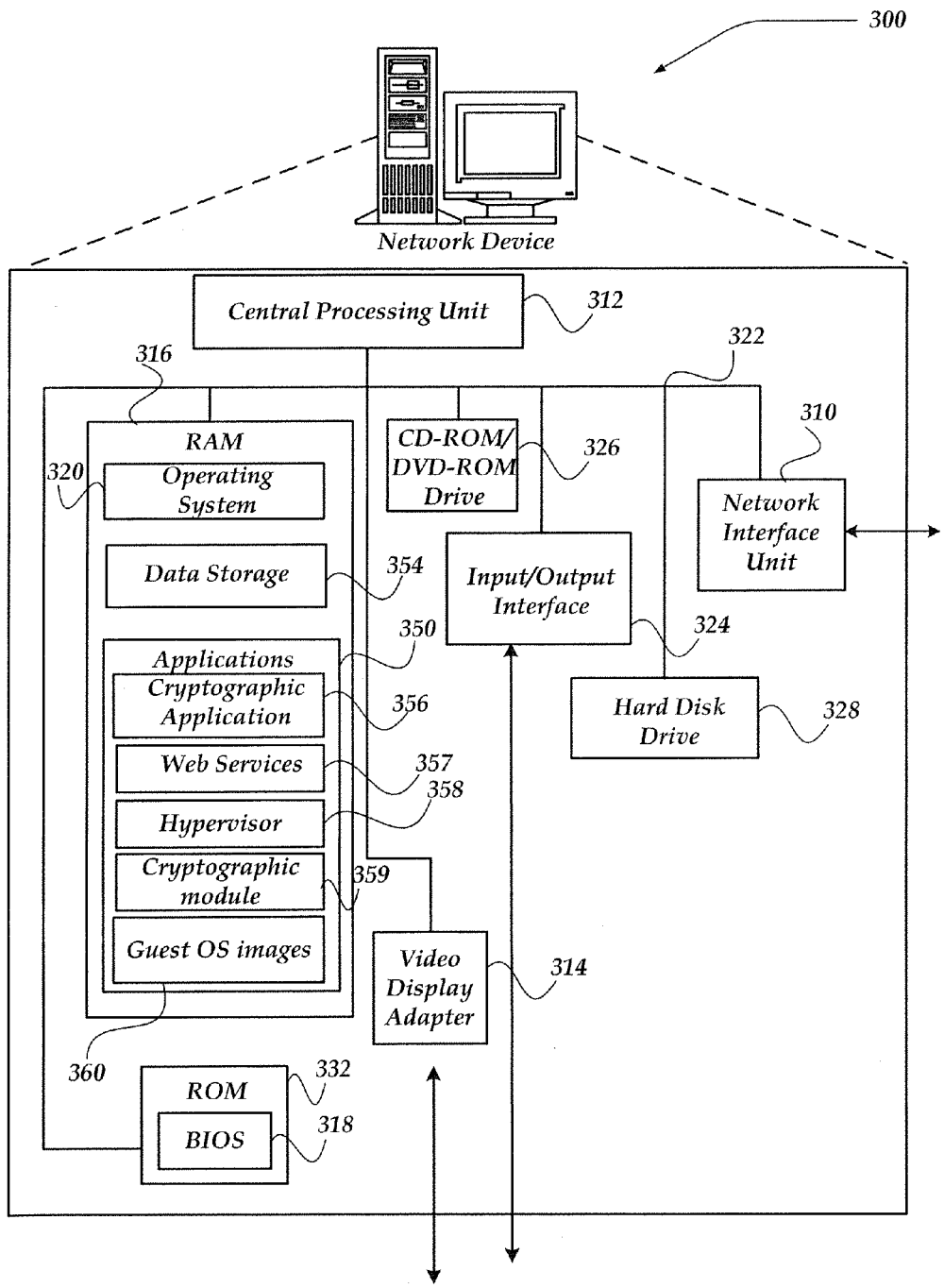
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, cryptographic device 113 of FIG. 1.

Network device 300 includes central processing unit 312, video display adapter 314, and a mass memory, RAM 316, ROM 332, all in communication with each other via bus 322. The mass memory generally includes one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 354 may include a database, text, spreadsheet, folder, file, or the like Data storage 354 may further include program code, data, algorithms, or the like, for use by a processor, such as central processing unit (CPU) 312 to execute and perform actions. In one embodiment, at least some of data and/or instructions stored in data stores 354 might also be stored on another device or network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include cryptographic application 356, web services 357, hypervisor 358, cryptographic module 359, and guest applications 360.

Web services 357 represent any of a variety of services that are configured to provide content, over a network to another computing device. Thus, web services 357 include for example, a web server, a File Transfer Protocol (FTP) server, a database server, a content server, or the like. Web services 357 may provide the content over the network using any of a variety of formats, including, but not limited to WAP, HDML, WML, SGML, HTML, XML, compact HTML (cHTML), extensible (xHTML), or the like.

In one embodiment, web services 357 may provide an interface for accessing and manipulating data in a data store, such as data storage 354, or the like. In another embodiment, web services 357 may provide interfaces for interacting with cryptographic application 356 and/or cryptographic module 359 that may enable a user to access and/or otherwise manage cryptographic services that may be provided through network device 300.

In at least one of the various embodiments, hypervisor 358 may manage one or more virtualized guest applications and/or guest operating systems that may be operating on network device 300. In at least one of the various embodiments, guest applications may be virtualized hosts that may be operating under the management of hypervisor 358. In at least one of the various embodiments, hypervisor 358, cryptographic module 359, and guest applications 360 may be operating on servers 107-109.

In at least one of the various embodiments, cryptographic module 359, may be enabled to encrypt and decrypt volatile and non-volatile memory that may be used by guest applications 360. In at least one of the various embodiments, cryptographic module 359 may be a component of hypervisor 358. Or, in at least one of the various embodiments, it may be deployed as a process, plug-in, extension, kernel module, or the like.

In at least one of the various embodiments, cryptographic application 356 may be deployed on a computing appliance network device, such as, cryptographic device 113, separate from hypervisor 358, cryptographic module 359, and/or guest applications 360 that may be utilizing the cryptographic services provided by cryptographic application 356. In at least one of the various embodiments, cryptographic application 356 may be located on and may be operative on the same network device as hypervisor 358, cryptographic module 359, and guest applications 360.

In any event, in at least one of the various embodiments, cryptographic application 356, web services 357, hypervisor 358, cryptographic module 359, and/or guest applications 360 may employ processes, or parts of processes, similar to those described in conjunction with FIGS. 5-12 to perform at least some actions.

Generalized Operation

Figure 4:
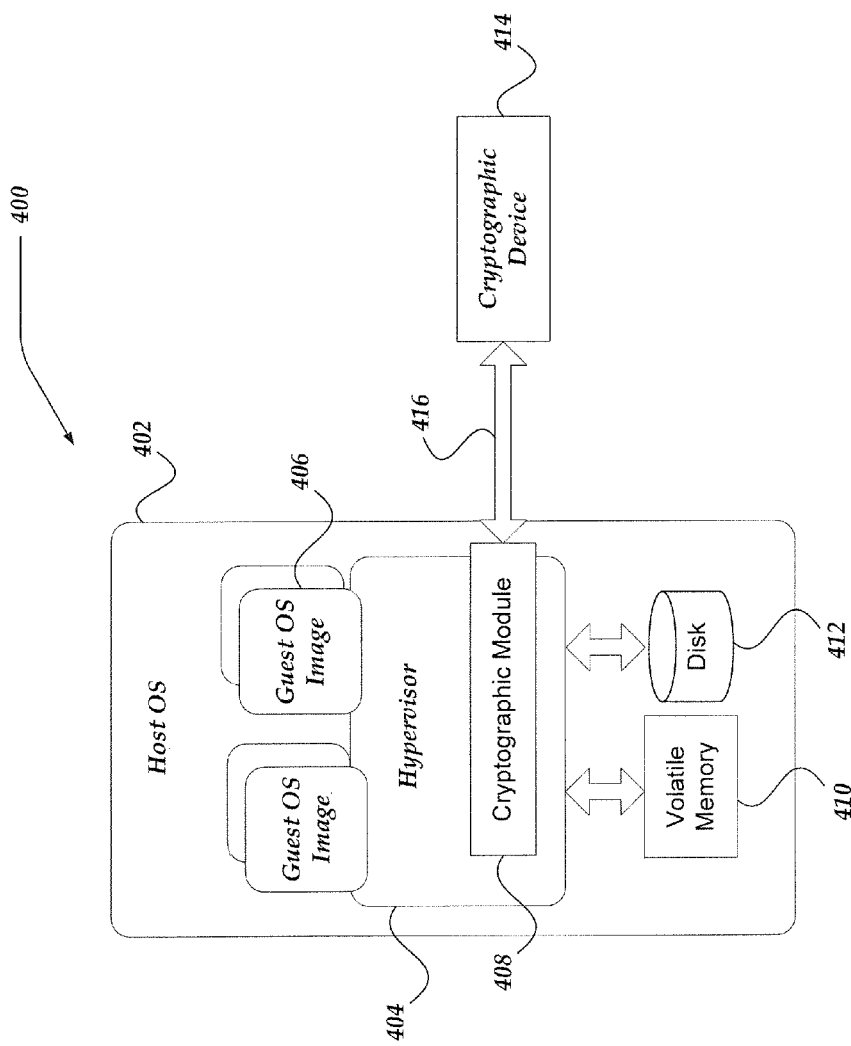
FIG. 4 shows an overview of a virtual environment computing device in accordance with at least one of the various embodiments.

FIG. 4 shows, for at least one of the various embodiments, a virtual computing node 400 (VCN). In at least one of the various embodiments, VCN may be operative on a variety of different types of computing devices including, network device 300. Also, in at least one of the various embodiments, VCN may be employed as stand-alone computing device or as part of a networked cluster of network devices.

In at least one of the various embodiments, host operating system (host OS) 402 may be deployed on VCN 400 and may comprise operating systems configured and/or enabled to support virtualization of guest operating systems (guest OS image) such as guest OS image 406.

In at least one of the various embodiments, hypervisor 404 may be employed on VCN 400 to provide services for managing and/or hosting one or more guest OS images. In at least one of the various embodiments, hypervisor 404 may be a process running on or in host OS 402 (e.g., Type II hypervisor). Or, in at least one of the various embodiments, hypervisor 404 may be modules that may be integrated to be part of host OS 402 (e.g., Type I hypervisor). In at least one of the various embodiments, Type I hypervisor configurations may comprise plug-ins, customization, and/or extensions to standard computer operating systems.

In at least one of the various embodiments, hypervisor 404 may manage/supervise one or more guest OS images. In at least one of the various embodiments, hypervisor 404 may provide abstractions that emulate the physical resources on the VCN, including, a RAM storage interface emulator, an I/O emulator (e.g., abstracting I/O devices), CPU scheduling emulation, or the like.

In at least one of the various embodiments, if a guest OS image makes or initiates a request and/or command that may access protected or privileged resources emulated and/or supervised by the hypervisor, an exception and/or interrupt condition may be generated that may suspend the operation of the guest OS image and give control over to the hypervisor. In at least one of the various embodiments, if the hypervisor receives control it may perform the protected and/or privileged operation on behalf of the guest OS image and return the results of the operation to the guest OS image.

In at least one of the various embodiments, at least one function of hypervisor 404 may be performing the privileged operations for the guest OS images such that the guest OS images may be "unaware" that they may be operating in a virtualized computing environment.

In at least one of the various embodiments, one or more guest OS images 406 may be installed on VCN 400. In at least one of the various embodiments, each guest OS image 406 may be a different operating system executing under the supervisor of the host OS and the hypervisor. In at least one of the various embodiments, guest OS images may be unaware of existence of each other and the host OS. Furthermore, guest OS images may be unaware that they may be operating in a virtualized computing environment managed by a hypervisor.

In at least one of the various embodiments, some guest OS images may be configured to be protected such that hypervisor 404 may employ enhanced security and cryptographic services, such as, preventing and/or limiting unauthorized access to the guest OS image, data visibility, or the like. In at least one of the various embodiments, protection may extend to memory associated with operative processes that may be executing within the context of a protected guest OS image. Further, in at least one of the various embodiments, the virtual hard-drives/partitions associated with a protected guest OS image may be protected using enhanced security and cryptographic services as well.

In at least one of the various embodiments, cryptographic module 408 may be employed to provide enhanced encryption and security services for protected guest OS images. In at least one of the various embodiments, cryptographic module 408 may be positioned between hypervisor 404 and guest OS images 406 so that it may intercept and/or intervene if memory access operations associated with the protected guest OS images may occur.

In at least one of the various embodiments, cryptographic module 408 may be arranged as an extension, plug-in, customization, or the like, to hypervisor 406. In at least one of the various embodiments, cryptographic module 408 may be an extension, plug-in, add-on, customization, or the like, of host OS 402. Also, in at least one of the various embodiments, cryptographic module 408 may be a privileged process operating within host OS 402. In at least one of the various embodiments, cryptographic module 408 may intercept and/or intervene in hypervisor operations to provide enhanced cryptographic services.

Further, in at least one of the various embodiments, in conjunction with providing enhanced security and cryptographic services for protected guest OS images, cryptographic module 408 may be arranged to communicate with cryptographic device 414. In at least one of the various embodiments, cryptographic module 408 may request information and services from cryptographic device 414 that may enable cryptographic module 408 to perform cryptographic services.

In at least one of the various embodiments, cryptographic device 414 may be a secured cryptographic services appliance that may be employed to provide key management, certificate management, or other cryptographic services that may be employed by cryptographic module 408. In at least one of the various embodiments, some or all of the cryptographic services may be provided by web-based services that may be accessible over the internet. In some embodiments, services may be divided between an appliance such as cryptographic device 414 and a web-based service. For example, in at least one of the various embodiments, a web-based service may be used to provide key management while a cryptographic device may provide encryption and decryption services.

In at least one of the various embodiments, network pathway 416 may enable one or more cryptographic modules to communicate with one or more cryptographic devices, including cryptographic device 414. Network pathway 416 may utilize portions of network 111 and/or wireless carrier network 110. Also, in at least one of the various embodiments, network pathway may utilize network encryption protocols such as SSL, TLS, or the like. If network pathway 416 is a wireless network, wireless network encryption protocols such as, WPA, WPA2, WPA2-PSK, WPA2-ENT, or the like. Further, in at least one of the various embodiments, cryptographic module(s) 408 may communicate with cryptographic device(s) 414 through virtual private networks and/or other secure tunneling technologies.

Figure 5:
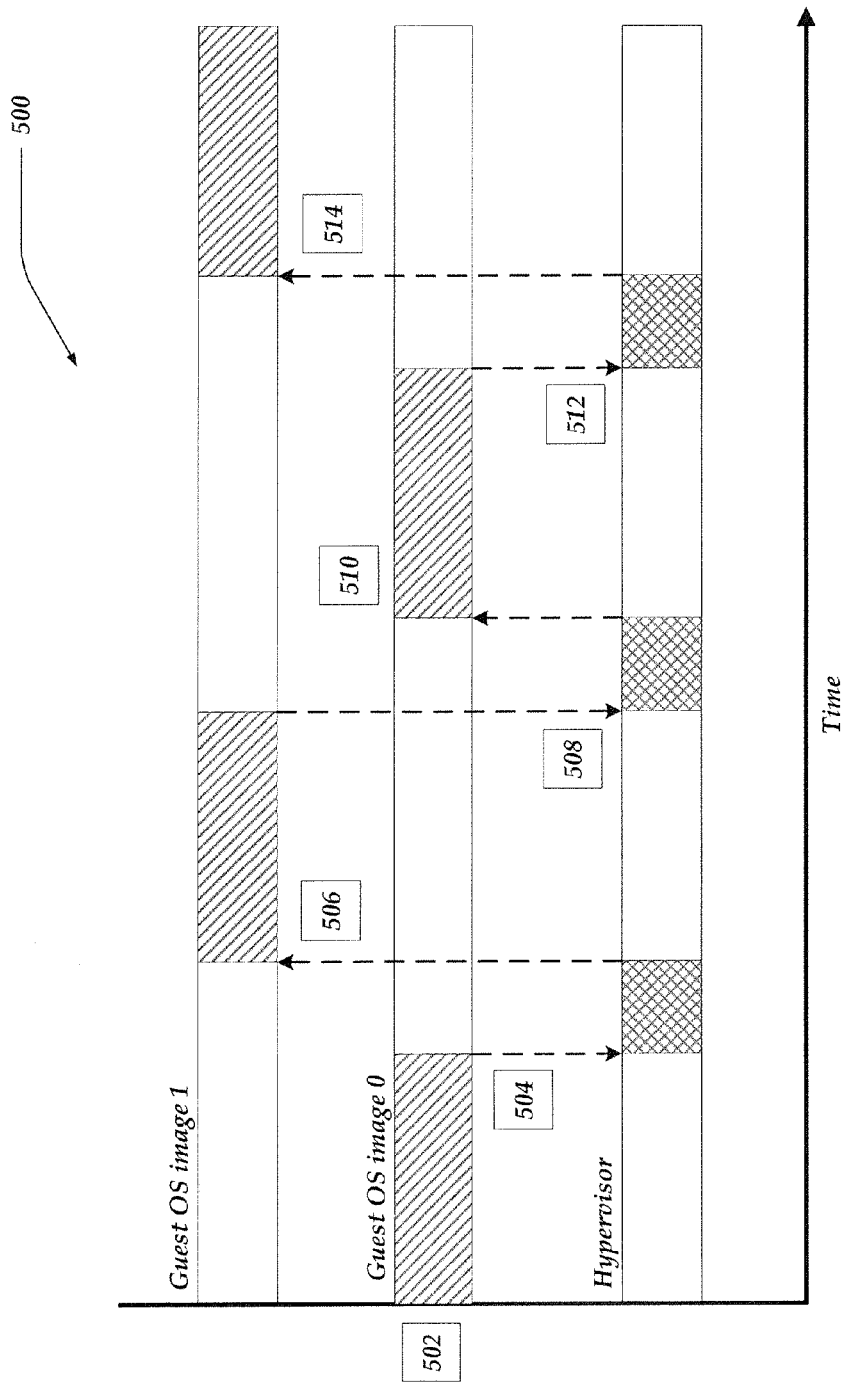
FIG. 5 illustrates a scheduling sequence for a hypervisor with two Guest OS image instances in accordance with at least one of the various embodiments.

FIG. 5 illustrates, for at least one of the various embodiments, scheduling sequence 500 for a hypervisor managing two guest OS images. In at least one of the various embodiments, one or more guest OS images may be operating under the management/supervision of a hypervisor. Sequence 500, for at least one of the various embodiments, illustrates two guest OS images and a hypervisor sharing a physical CPU core. In at least one of the various embodiments, each time a guest OS image performs a protected and/or managed operation a context switch may occur enabling the hypervisor to be scheduled for executing instructions on the physical CPU core.

In at least one of the various embodiments, protected and/or managed operations may include, I/O operations, disk access, memory reads, memory writes, or the like.

At step 502, in at least one of the various embodiments, guest OS image 0 may be operating and executing instructions using a physical CPU core. In at least one of the various embodiments, guest OS image 0 may be executing a variety of processes and applications within the context of its environment. In at least one of the various embodiments, the guest OS image may remain scheduled on the CPU core even as context switches among processes and threads operating within the context of the guest OS image environment may occur.

In at least one of the various embodiments, sequence 500 may be generalized to apply to guest OS images that may be operative on single-core and/or multi-core CPU's and still remain within the scope of the present innovations.

At step 504, in at least one of the various embodiments, a context switch may cause control of the physical CPU core to transfer to the hypervisor.

In at least one of the various embodiments, the hypervisor may be responsible for managing and allocating the physical resources of the host device among the one or more guest OS images that may be under its supervision. Thus, in at least one of the various embodiments, if a guest OS image attempts to execute privileged functions that may relate to accessing a physical device (e.g., I/O storage, disk storage, or the like), these privileged functions may be trapped by the hypervisor. The hypervisor may trap privileged functions so the hypervisor may execute them on behalf of the guest OS image. In at least one of the various embodiments, if the hypervisor receives data and/or results that correspond to the privileged operation, it may return those results to the guest OS image.

In at least one of the various embodiments, from the perspective of the guest OS image, the privileged operation executes as it would if the guest OS image was not operating in a virtualized environment under the management of a hypervisor.

In at least one of the various embodiments, the guest OS image must be de-scheduled from the physical CPU to enable the hypervisor to perform the privileged operations as requested. This may enable the hypervisor to access the physical CPU to perform the privileged operation(s).

In at least one of the various embodiments, if operating on multi-processor and/or multi-core CPU system, a guest OS image waiting for the hypervisor to perform privileged operations on its behalf may be de-scheduled, even if there are other CPU/cores for the hypervisor to use, allowing the CPU/core to be assigned to other tasks.

In at least one of the various embodiments, the guest OS image may be de-scheduled because the hypervisor may have determined that the guest OS image time slice may have expired. In this case, in at least one of the various embodiments, the hypervisor may preemptively interrupt the guest OS image and force the de-scheduling.

In at least one of the various embodiments, if a guest OS image may be de-scheduled, the hypervisor may collect and store the context information for the guest OS image. In at least one of the various embodiments, the stored context information may enable the hypervisor to restore the guest OS image to its last known state if the guest OS image is re-scheduled on the CPU.

In at least one of the various embodiments, the hypervisor may store sufficient context information for the guest OS image to seamlessly return to an operative state with its internal state restored to they way it was before being de-scheduled.

In at least one of the various embodiments, context information may include the contents of the register set associated with the guest OS image, including the contents of a program counter, or the like. Also, in at least one of the various embodiments, context information may include mapping tables and/or contents of registers relating to the memory mapping for the guest OS image.

In at least one of the various embodiments, if the hypervisor may be preparing to de-schedule a protected guest OS image, the cryptographic module may intervene in the context switch process and encrypt the protected guest OS image's context information. In at least one of the various embodiments, if the context information is encrypted, the encrypted information may be returned to the hypervisor so the hypervisor may store the context information. In at least one of the various embodiments, the hypervisor may use the same mechanism that it uses to store the unencrypted context information. Or, in at least one of the various embodiments, different mechanism may be used to store unencrypted context information.

At step 506, in at least one of the various embodiments, another context switch may occur that may enable guest OS image 1 to execute instructions using the physical CPU core.

In at least one of the various embodiments, the hypervisor may release control of the physical CPU enabling a guest OS image to use the physical CPU. In at least one of the various embodiments, the hypervisor may retrieve the stored context information for the guest OS image that is being prepared for scheduling to a physical CPU/core.

In at least one of the various embodiments, if the guest OS image may be protected, the hypervisor may provide the context information to the cryptographic module for decryption. In at least one of the various embodiments, if the context information may be decrypted the cryptographic module may return the decrypted context information to the hypervisor. In at least one of the various embodiments, the hypervisor may employ the decrypted context information to prepare the physical CPU to begin executing instructions for the guest OS image.

Further, in at least one of the various embodiments, the hypervisor may use the decrypted context information for preparing guest specific components and data structures for the pending context switch, such as, virtual memory page translation tables, I/O port mapping, frame buffers, or the like.

At step 508, in at least one of the various embodiments, context may switch from Guest OS image 1 back to the hypervisor. In at least one of the various embodiments, after a period of time, the hypervisor may initiate another context switch, this time switching the CPU core context to guest OS image 1. In at least one of the various embodiments, if guest OS image 1 may be a protected guest, the hypervisor and cryptographic module may perform actions similar to the context switch at step 504. In at least one of the various embodiments, if guest OS image 1 may be unprotected the context switch may occur without the cryptographic module's intervention.

At steps 510-514, in at least one of the various embodiments, the hypervisor may continue performing context switches between guest OS image 0, guest OS image 1, or the hypervisor as described in the previous steps. In at least one of the various embodiments, context switching may continue as long as the hypervisor may be operative to manage guest OS images.

One of ordinary skill in the art will appreciate that sequence 500 may not exhaustively illustrate the type and number of context switches that may occur in an operative system. Nor, should the scale and proportion of the figures and traces in sequence 500 be limiting. Also, even though sequence 500 may illustrate just a portion of a time trace it discloses sufficient details to enable one of ordinary skill in the art to understand and/or practice the various embodiments.

Figure 6:
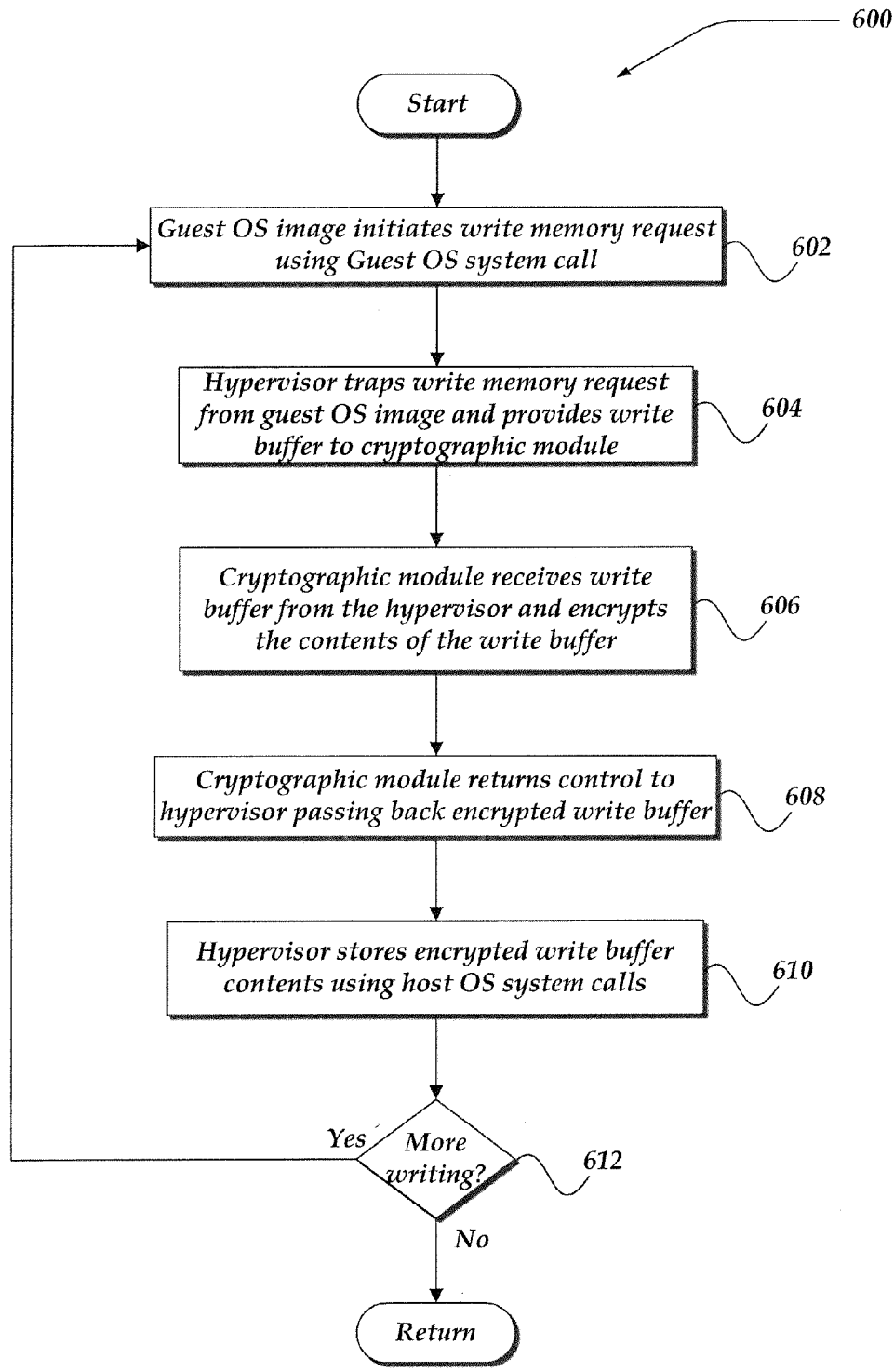
FIG. 6 shows a flowchart for a process that may be used for providing enhanced cryptographic services if a protected guest OS image may be performing write operations in accordance with at least one of the various embodiments.

FIG. 6 shows a flowchart for at least one of the various embodiments of process 600 that may be used for providing enhanced cryptographic services if a protected guest OS image may be performing write operations. After a start block, at block 602, in at least one of the various embodiments, a guest OS image may initiate a write memory request using a system call local to the guest OS image.

At block 604, in at least one of the various embodiments, the hypervisor may interrupt the write operation by trapping the guest OS image request and providing at least the contents of a write buffer to the cryptographic module.

In at least one of the various embodiments, the hypervisor may generate a data structure that may be passed to the cryptographic module along with, or as part of the write buffer. Such a data structure may include additional meta-data such as buffer size, type of call, identification of the guest OS image, or the like. In at least one of the various embodiments, the guest OS image may be identified by a unique identifier that may be encrypted and/or contained in a security certificate.

In at least one of the various embodiments, the data structure passed to the cryptographic module may include sufficient information to enable the cryptographic module to identify the guest OS image and/or to determine the appropriate cryptographic services and/or resources for the write request.

At block 606, in at least one of the various embodiments, the cryptographic module may receive the write buffer from the hypervisor and encrypt the contents of the write buffer.

At block 608, in at least one of the various embodiments, if the contents of the write buffer may have been encrypted the cryptographic module may return control to the hypervisor by passing back the encrypted contents of the write buffer.

At block 610, in at least one of the various embodiments, the hypervisor may store the encrypted write buffer contents using host OS system calls.

At decision block 612, in at least one of the various embodiments, if there are more writing/write requests to process, control may loop back to block 602. Otherwise, in at least one of the various embodiments, control may be returned to a calling process.

Figure 7:
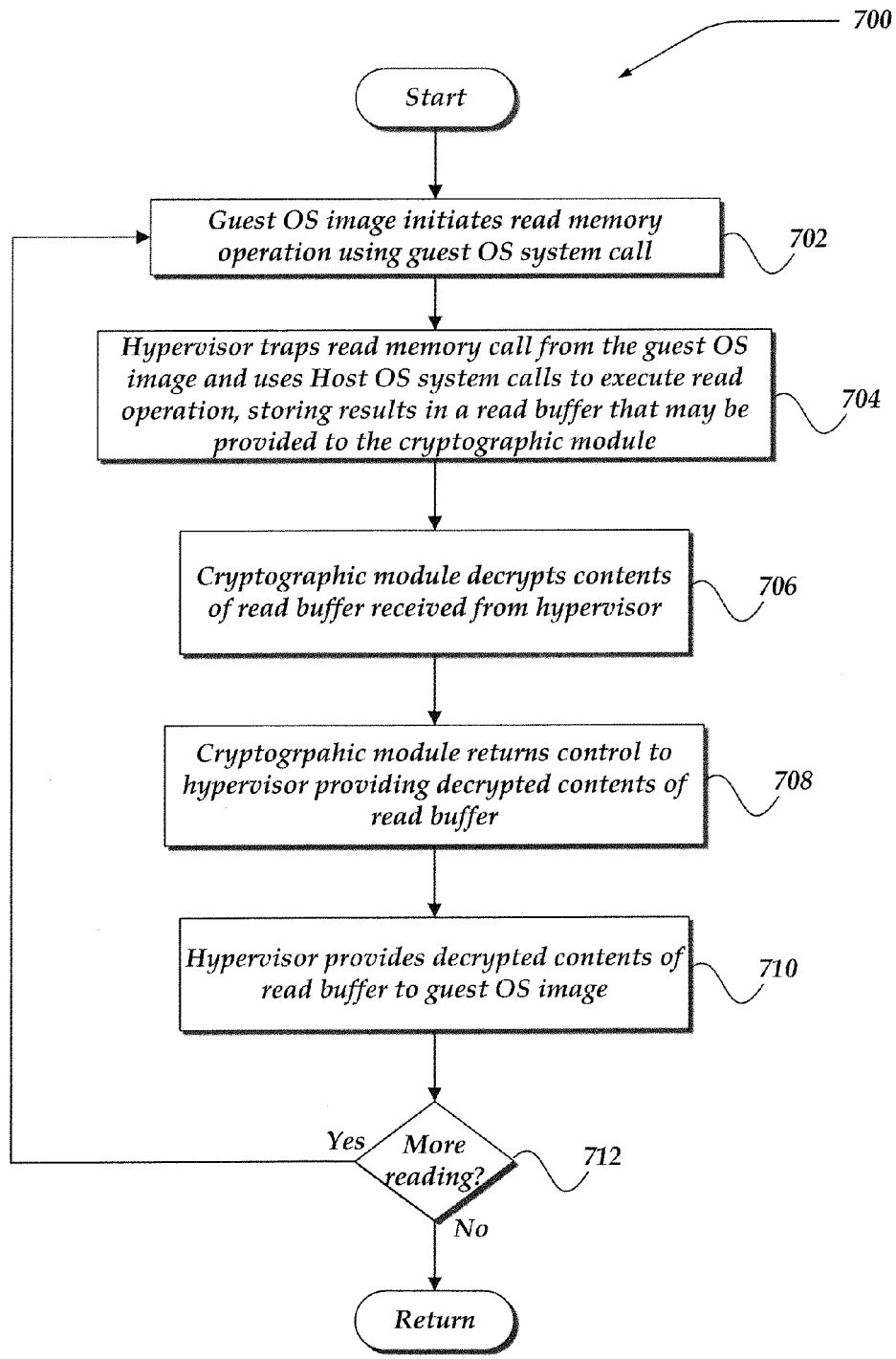
FIG. 7 shows a flowchart for a process that may be used for providing enhanced cryptographic services if a protected guest OS image may be performing read operations in accordance with at least one of the various embodiments.

FIG. 7 shows a flowchart for at least one of the various embodiments of process 700 that may be used for providing enhanced cryptographic services if a protected guest OS image may be performing read operations. After a start block, at block 702, in at least one of the various embodiments, a guest OS image may initiate a read request using a system call local to the guest OS image.

At block 704, in at least one of the various embodiments, the hypervisor may trap read memory calls made by the guest OS image and use the host OS system calls to execute the read operation, storing the results in a read buffer that may be provided to the cryptographic module.

In at least one of the various embodiments, the hypervisor may generate a data structure that may be passed to the cryptographic module along with, or as part of the read buffer. Such a data structure may include additional meta-data such as buffer size, type of call, identification of the guest OS image, or the like. In at least one of the various embodiments, the guest OS image may be identified by a unique identifier that may be encrypted and/or contained in a security certificate.

In at least one of the various embodiments, the data structure passed to the cryptographic module may include sufficient information to enable the cryptographic module to identify the guest OS image and/or to determine the appropriate cryptographic services and/or resources for the read request.

At block 706, in at least one of the various embodiments, the cryptographic module may decrypt the contents of the read buffer that may have been received from the hypervisor.

At block 708, in at least one of the various embodiments, if the contents of the read buffer may have been decrypted the contents of the read buffer may be provided to the hypervisor.

At block 710, in at least one of the various embodiments, the hypervisor may provide the decrypted contents of the read buffer to the guest OS image to complete the guest OS image read operation.

At decision block 712, in at least one of the various embodiments, if there may be more read operations and/or read requests, control may loop back to block 702. Otherwise, in at least one of the various embodiments, control may be returned to a calling process.

Figure 8:
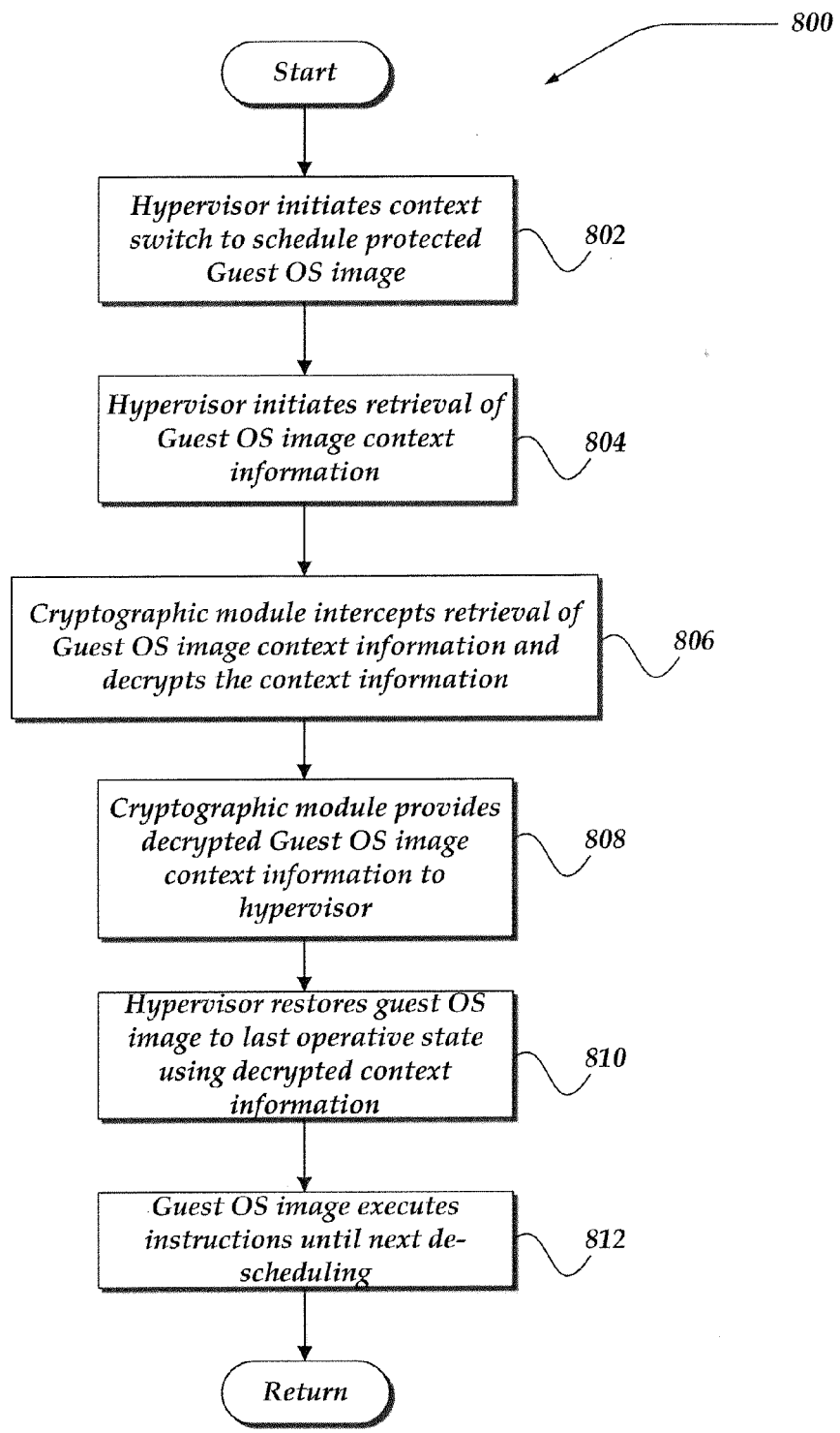
FIG. 8 shows a flowchart for a process that may be used for providing enhanced cryptographic services if a protected guest OS image may be scheduled to receive a time slice of a physical CPU in accordance with at least one of the various embodiments.

FIG. 8 shows a flowchart for at least one of the various embodiments of process 800 that may be used for providing enhanced cryptographic services and/or cryptographic operations if a protected guest OS image may be scheduled to receive a time slice of a physical CPU. After a start block, at block 802, in at least one of the various embodiments, the hypervisor may initiate a context switch in preparation of enabling a protected guest OS image to execute instructions on a physical CPU.

At block 804, in at least one of the various embodiments, the hypervisor may retrieve the stored context information for the protected guest OS image being scheduled.

At block 806, in at least one of the various embodiments, the cryptographic module may intercept and/or intervene in the retrieval of the guest OS image content and if possible decrypt the guest OS image context information.

In at least one of the various embodiments, the hypervisor may generate a data structure that may be passed to the cryptographic module along with, or as part of the context information. This data structure may include additional meta-data such as buffer size, identification of the guest OS image, or the like. In at least one of the various embodiments, the guest OS image may be identified by a unique identifier that may be encrypted and/or contained in a security certificate.

In at least one of the various embodiments, the data structure passed to the cryptographic module may include sufficient information to enable the cryptographic module to identify the guest OS image and/or to determine the appropriate cryptographic services and/or resources for support of the context switch.

At block 808, in at least one of the various embodiments, the cryptographic module may provide the decrypted guest OS image context information to the hypervisor.

At block 810, in at least one of the various embodiments, the hypervisor may restore the guest OS image being scheduled to its last operative state based on the decrypted context information.

At block 812, in at least one of the various embodiments, the guest OS image may execute instructions until it may be de-scheduled by the hypervisor. Next, control may be returned to a calling process.

Figure 9:
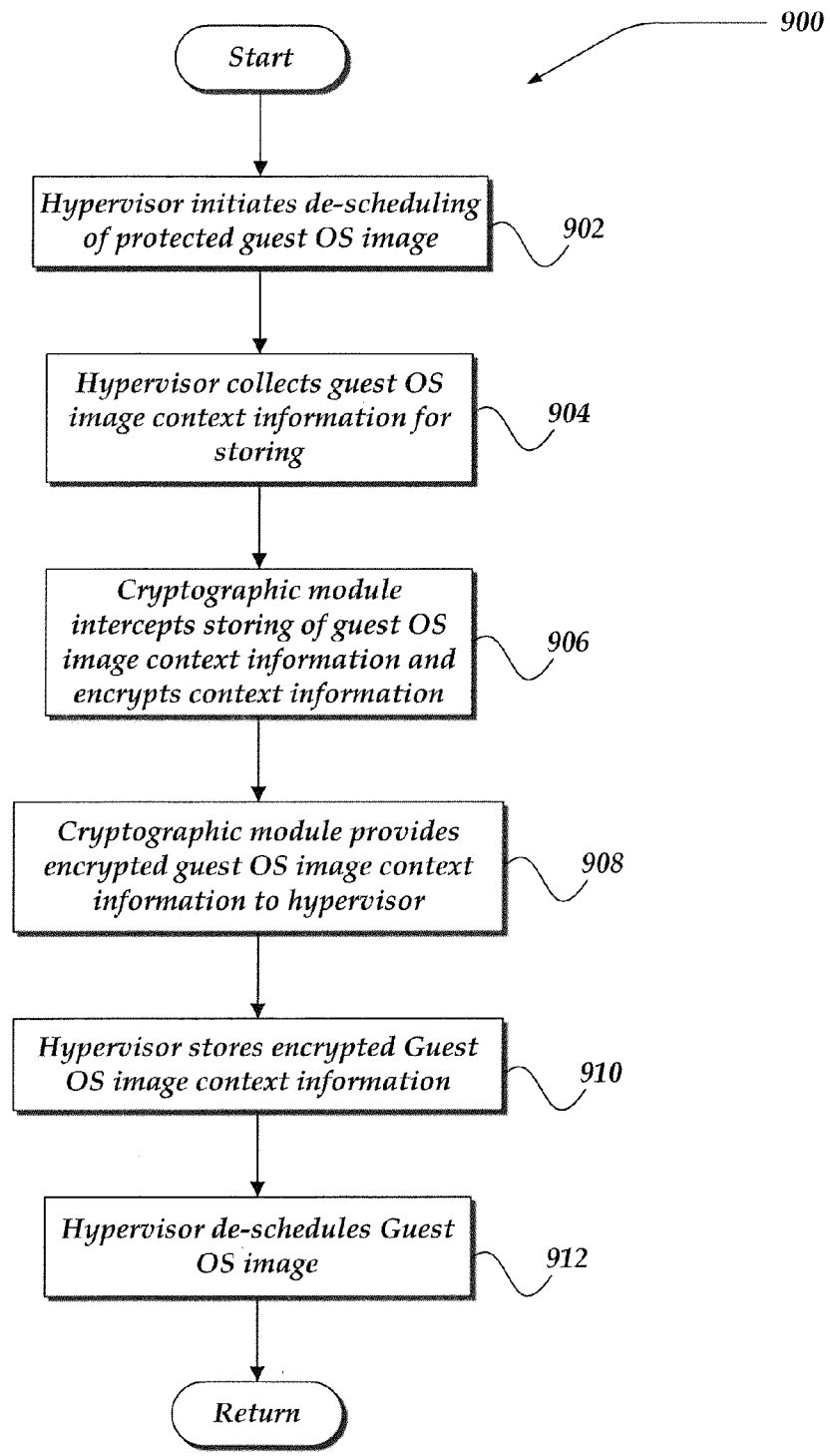
FIG. 9 shows a flowchart for a process that may be used for providing enhanced cryptographic services if a protected guest OS image may be de-scheduled from a physical CPU in accordance with at least one of the various embodiments.

FIG. 9 shows a flowchart for at least one of the various embodiments of process 900 that may be used for providing enhanced cryptographic services if a protected guest OS image may be de-scheduled from a physical CPU. After a start block, at block 902, in at least one of the various embodiments, the hypervisor may initiate the de-scheduling of a protected guest OS image.

At block 904, in at least one of the various embodiments, the hypervisor may collect context information for the protected guest OS image for storing while the guest OS image may be de-scheduled.

At block 906, in at least one of the various embodiments, the cryptographic module may intercept the storing of the guest OS image context information and may encrypt the context information.

In at least one of the various embodiments, the hypervisor may generate a data structure that may be passed to the cryptographic module along with, or as part of, the context information. This data structure may include additional metadata such as buffer size, identification of the guest OS image, or the like. In at least one of the various embodiments, the guest OS image may be identified by a unique identifier that may be encrypted and/or contained in a security certificate.

In at least one of the various embodiments, the data structure passed to the cryptographic module may include sufficient information to enable the cryptographic module to identify the guest OS image and/or to determine the appropriate cryptographic services and/or resources for support of the context switch.

At block 908, in at least one of the various embodiments, the cryptographic module may provide the encrypted guest OS image context information to the hypervisor.

At block 910, in at least one of the various embodiments, the hypervisor may store the encrypted guest OS image context information.

At block 912, in at least one of the various embodiments, the hypervisor may de-schedule the protected guest OS image. Next, control may be returned to a calling process.

Figure 10:
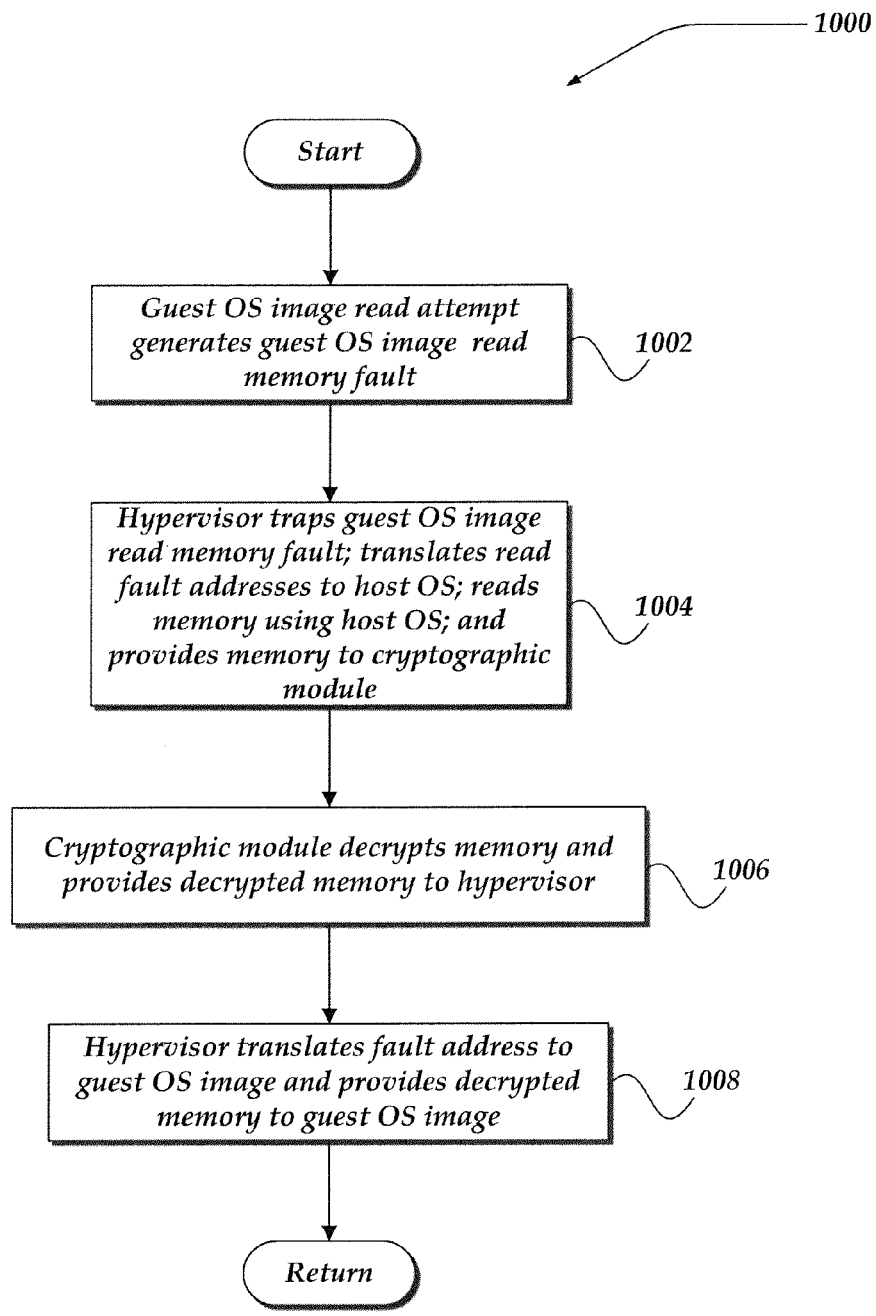
FIG. 10 shows a flowchart for a process that may be used for providing enhanced cryptographic services if a protected guest OS image may generate a read memory fault in accordance with at least one of the various embodiments.

FIG. 10 shows a flowchart for at least one of the various embodiments of process 1000 that may be used for providing enhanced cryptographic services if a protected guest OS image may generate a read memory fault. In at least one of the various embodiments, a read memory fault may occur if a protected guest OS tries to read memory that for some reason has not been loaded into the resident memory address space of the protected guest OS. In at least one of the various embodiments, this may be program code or data code that may be executing in the context of a guest OS image. After a start block, at block 1002, in at least one of the various embodiments, the guest OS image may make a read attempt that may generate a read memory fault within the guest OS image.

At block 1004, in at least one of the various embodiments, the hypervisor may trap the guest OS image read memory fault. In at least one of the various embodiments, the hypervisor may translate the guest OS image memory fault address into a host OS address and read in the memory using the host OS and provide the memory to the cryptographic module.

In at least one of the various embodiments, the organization of the memory that is read may depend on the underlying architecture of processors (CPU) and/or the operating systems involved in the read operation. For example, some architectures may associate read memory faults with memory pages. Other architectures may not be so limited. For example, in some cases, the amount of memory associated with a read fault may not be fixed to a particular amount like a memory page. In these embodiments, the read memory faults may result in the hypervisor reading a portion of memory that may be more or less than a memory page.

At block 1006, in at least one of the various embodiments, the cryptographic module may de-crypt the memory and provide a decrypted copy of the memory to the hypervisor.

At block 1008, in at least one of the various embodiments, the hypervisor may translate the memory address to the guest OS image and provide the decrypted memory to the guest OS image. Next, control may be returned to a calling process.

Figure 11:
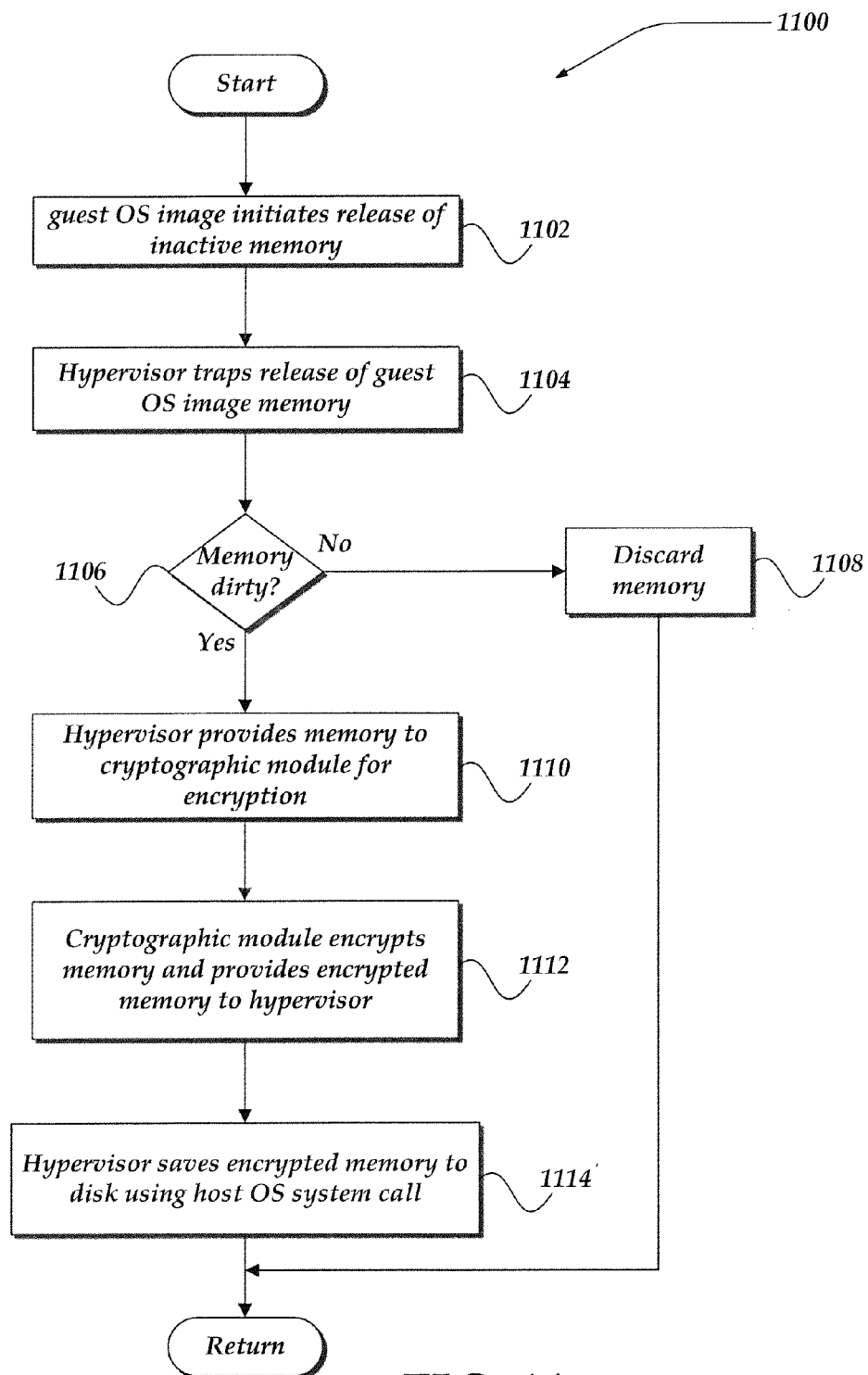
FIG. 11 shows a flowchart for a process that may be used for providing enhanced cryptographic services if a protected guest OS image releases a portion of inactive memory in accordance with at least one of the various embodiments.

FIG. 11 shows a flowchart for at least one of the various embodiments of process 1200 that may be used for providing enhanced cryptographic services if a protected guest OS image may release a portion of inactive memory. After a start block, at block 1102, in at least one of the various embodiments, a guest OS image may initiate the release of inactive memory.

At block 1104, in at least one of the various embodiments, the hypervisor may trap the release of the guest OS image memory.

At decision block 1106, in at least one of the various embodiments, if the released memory may have been written to or otherwise modified (e.g. dirty), control may flow to block 1110. Otherwise, in at least one of the various embodiments, control may move to block 1108 where, in at least one of the various embodiments, the memory may be discarded.

At block 1110, in at least one of the various embodiments, the hypervisor may provide the memory to the cryptographic module for encryption.

At block 1112, in at least one of the various embodiments, the cryptographic module may encrypt the memory and provide the encrypted memory to the hypervisor.

At block 1114, in at least one of the various embodiments, the hypervisor may save the encrypted memory to storage using host OS system calls and/or kernel calls. Next, control may be returned to a calling process.

Figure 12:
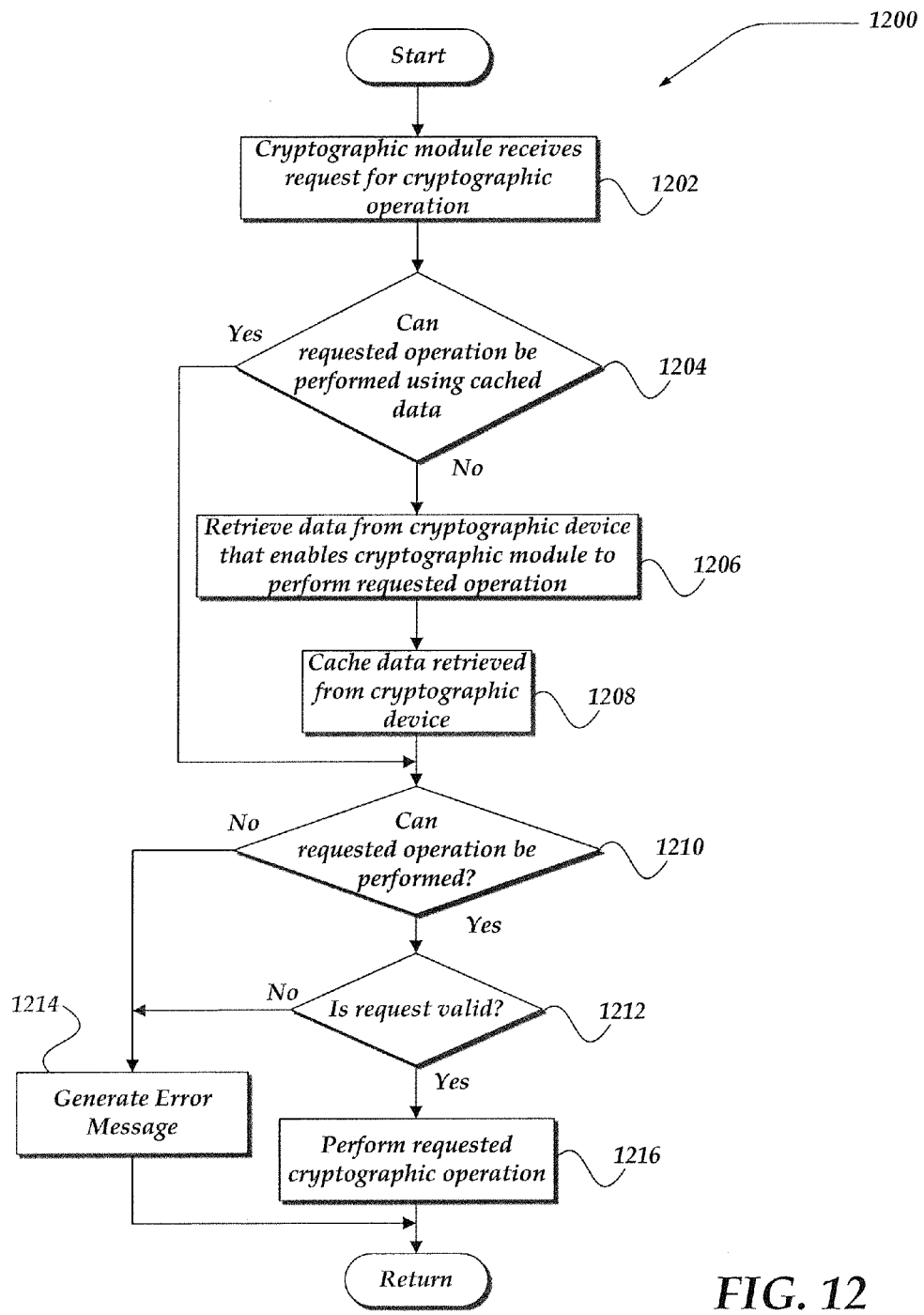
FIG. 12 shows a flowchart for at least one of the various embodiments for a process that may be used for providing further support for enhanced cryptographic services for a protected guest OS image in accordance with at least one of the various embodiments.

FIG. 12 shows a flowchart for at least one of the various embodiments of process 1200 that may be used for providing further support for enhanced cryptographic services for a protected guest OS image. After a start block, at block 1202, in at least one of the various embodiments, the cryptographic module may receive a request for providing one or more cryptographic operations and/or security services in support of protecting a guest OS image.

At decision block 1204, in at least one of the various embodiments, if the requested services and/or cryptographic operation may be performed using data and/or information currently cached by the cryptographic module, control may move to decision block 1210. Otherwise, in at least one of the various embodiments, control may move to block 1206.

At block 1206, in at least one of the various embodiments, the cryptographic module may make a request to a cryptographic device to obtain the cryptographic data and/or information that may enable the cryptographic module to perform requested services and/or cryptographic operations.

In at least one of the various embodiments, cryptographic data provided by the cryptographic device may include cryptographic keys, security certificates, policy instructions, or the like.

In at least one of the various embodiments, cryptographic data may be associated with one or more guest OS images based on configuration setting, policy rules, or the like. Further, in at least one of the various embodiments, cryptographic data may be associated to one or more hypervisors based on configuration setting, policy rules, or the like.

At block 1208, in at least one of the various embodiments, the cryptographic module may store the data and/or information retrieved from the cryptographic device in a local cache.

At decision block 1210, in at least one of the various embodiments, if the request services may be performed by the cryptographic module, control may move to decision block 1212. Otherwise, in at least one of the various embodiments, control may move to block 1214.

At decision block 1212, in at least one of the various embodiments, if the request may be determined to be valid, control may move to block 1216. Otherwise, in at least one of the various embodiments, control may move to block 1214.

At block 1214, in at least one of the various embodiments, the cryptographic module may generate an error message and/or an error response that may be based on the particular fault that occurred. In at least one of the various embodiments, if an error response may be generated, control may be returned to a calling process.

At block 1216, in at least one of the various embodiments, the cryptographic module may perform cryptographic services in response to the requests. If the cryptographic service request may have been processed, control may be returned to a calling process.

In at least one of the various embodiments, the cryptographic module may employ the data received from the cryptographic module and data received from a hypervisor to perform at least the requested cryptographic services.

Figure 13:
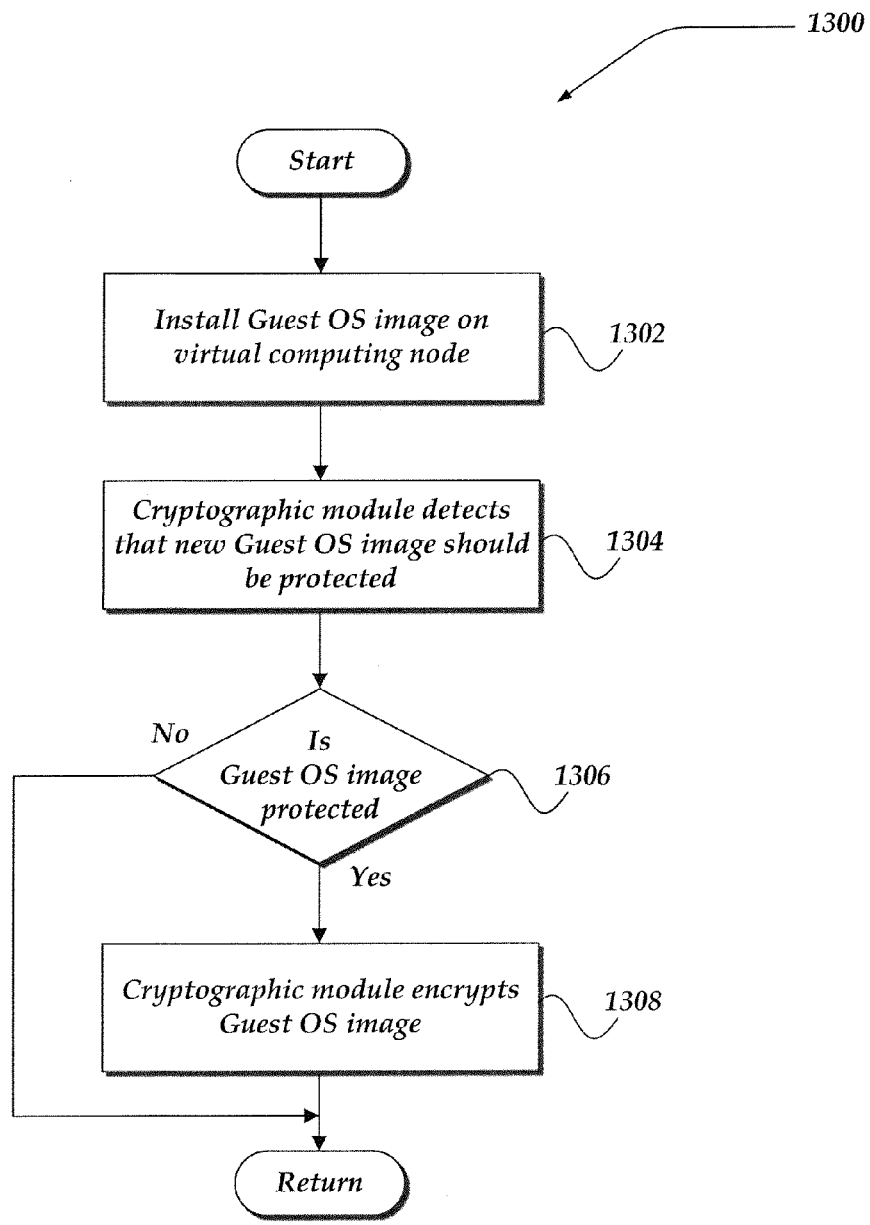
FIG. 13 shows a flowchart for a process that may be used for encrypting protected guest OS images as they may be installed in accordance with at least one of the various embodiments.

FIG. 13 shows a flowchart for at least one of the various embodiments, process 1300 that may be used for encrypting guest OS images as they may be installed.

In at least one of the various embodiments, the cryptographic module may monitor the host system to identify if new guest OS images have been installed onto the system. In at least one of the various embodiments, the cryptographic module may perform actions to protect discovered/detected guest OS images indicated as being guest OS images that require protection (protected guest OS images). If a guest OS image is determined to require cryptographic protection it may be deemed to be a protected guest OS image because the system may be required to perform actions to protect the guest OS image.

After a start block, at block 1302, in at least one of the various embodiments, a guest OS image may be installed on a host system. In at least one of the various embodiments, guest OS images may be installed from external storage sources, such as, ISO CD-ROMs, DVDs, USB thumb drives, network downloads, or the like. In at least one of the various embodiments, the installation of a guest OS image may be performed by activating a pre-loaded operating system images that may be registered with the hypervisor.

In at least one of the various embodiments, one or more inactive pre-loaded system images may be unencrypted. Also, in at least one of the various embodiments, one or more pre-loaded guest OS images may have been encrypted using cryptographic device 113 before registering them with the hypervisor as guest OS images.

In at least one of the various embodiments, installing and/or activating a guest OS image may include the execution of one or more configuration files and/or one or more setup programs/scripts that may facilitate the install of the guest OS image onto the hypervisor managed system. In at least one of the various embodiments, the scripts and/or installation programs may integrate with the cryptographic module as part of identifying if guest OS images may require protection.

At block 1304, in at least one of the various embodiments, the cryptographic module may detect that a new Guest OS image may have been installed. In at least one of the various embodiments, the cryptographic module may monitor the status of the host OS file system to determine if a new Guest OS image may have been installed or activated.

In other cases, in at least one of the various embodiments, the cryptographic module may have registered an event handler that may be called and/or signaled by the hypervisor, or another system monitoring system that may be operating on the host OS. By calling such an event handler, in at least one of the various embodiments, the cryptographic module may be alerted to perform actions for determining if the activated/installed Guest OS image should be protected.

At decision block 1306, in at least one of the various embodiments, if the new guest OS image may be determined to require protection, control may move to block 1308. Otherwise, control may be returned to a calling process.

In at least one of the various embodiments, the cryptographic module may determine if a guest OS image should be protected based on configuration information that may be stored in a database or file. Or, in at least one of the various embodiments, the cryptographic module may send a request to a cryptographic device to determine if a guest OS image should be protected.

Also, in at least one of the various embodiments, a user or an operator of the hypervisor, cryptographic module, or cryptographic device may be enabled to select the guest OS images that may be protected. Selecting guest OS images for protecting, in at least one of the various embodiments, may be accomplished using a command-line interface, graphical user interface, or the like.

At block 1308, in at least one of the various embodiments, the cryptographic module may encrypt the guest OS image. In at least one of the various embodiments, the cryptographic module may retrieve information and/or data from a cryptographic device that may enable the guest OS image to be encrypted. In at least one of the various embodiments, such information may include encrypting keys, security certificates, policy instructions, or the like.

In at least one of the various embodiments, the cryptographic module may cache some or all of the encryption information received from the cryptographic device either for use in encrypting additional guest OS images or for providing cryptographic services to one or more operative guest OS images.

In at least one of the various embodiments, a guest OS image may be selected for encrypting some time after it may be installed or activated. Such selection may be user and/or operator driven or it may be initiated by the application of a system wide policy and/or rule changes. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for protecting a guest operating system (OS) image within a virtualized computing environment with a network device that is operative to perform actions, comprising:
    employing at least one hypervisor to trap at least one privileged action associated with each guest OS image; and
    if a guest OS image associated with the trapped at least one privileged action is also designated for protection, performing further actions, comprising:
        if at least one cryptographic key is absent for performing a cryptographic operation on data associated with the at least one privileged action, retrieving the at least one cryptographic key from at least one remotely located cryptographic service provider;
        storing the at least one cryptographic key in at least one cache;
        if at least one cryptographic module is operative to perform the cryptographic operation on the data associated with the at least one privileged action and also the cryptographic operation is valid, enabling a cryptographic module to employ the at least one cryptographic key to perform the cryptographic operation on the data associated with the at least one privileged action; and
        if memory storing at least an inactive portion of the guest OS image associated with the trapped at least one privileged action is determined to be dirty, encrypting the at least inactive portion of the guest OS image stored in memory, wherein the hypervisor stores the at least encrypted inactive portion of the guest OS image.

2. The method of claim 1, wherein the cryptographic operation further comprises:
    if the cryptographic operation includes a write operation, performing further actions, including:
        receiving at least one write buffer with data from the at least one hypervisor;
        encrypting the data of the at least one write buffer; and
        providing the encrypted data to the at least one hypervisor.

3. The method of claim 1, wherein the at least one cryptographic operation further comprises:
    if the cryptographic operation is a read operation, performing further actions, including:
        receiving at least one read buffer that includes encrypted data from the at least one hypervisor;
        decrypting at least a portion of the encrypted data in the read buffer; and
        providing at least the decrypted portion of the encrypted data to the at least one hypervisor.

4. The method of claim 1, wherein employing the at least one hypervisor to trap the at least one privileged action further comprises at least one of trapping at least one read memory fault, or detecting at least for a release of at least one portion of inactive memory.

5. The method of claim 1, wherein employing the at least one hypervisor to trap the at least one privileged action further comprises:
    if the at least one hypervisor is de-scheduling the at least one guest OS image, performing further actions, including:
        employing the at least one hypervisor to collect at least a portion of the context information corresponding to the at least one guest OS image; and
        employing the at least one cryptographic module to encrypt the at least portion of the context information corresponding to the at least one guest OS image.

6. The method of claim 1, wherein employing the at least one hypervisor to trap the at least one privileged action further comprises:
    if the at least one hypervisor is scheduling the at least one guest OS image, performing further actions, including:
        employing the at least one hypervisor to retrieve at least the portion of the context information corresponding to the at least one guest OS image, wherein the at least portion of the context information is encrypted;
        employing the at least one cryptographic module to decrypt at least the portion of the context information corresponding to the at least one guest OS image; and
        employing the at least one hypervisor to restore the at least one guest OS image to an operative state based on at least the decrypted portion of the context information corresponding to the at least one guest image.

7. The method of claim 1, further comprising:
    employing the at least one cryptographic module to encrypt at least one activated guest OS image if the at least one activated guest OS image is at least a protected guest OS image.

8. A network device that is operative to protect a guest operating system (OS) image within a virtualized computing environment, comprising:
    a transceiver component for communicating over a network;
    a memory component for storing instructions and data; and
    a processor component that executes instructions that enable actions, including:
        employing at least one hypervisor to trap at least one privileged action associated with each guest OS image; and
        if a guest OS image associated with the trapped at least one privileged action is also designated for protection, enabling further actions, comprising:
            if at least one cryptographic key is absent for performing a cryptographic operation on data associated with the at least one privileged action, retrieving the at least one cryptographic key from at least one remotely located cryptographic service provider;
            storing the at least one cryptographic key in at least one cache;
            if at least one cryptographic module is operative to perform the cryptographic operation on the data associated with the at least one privileged action and also the cryptographic operation is valid, enabling a cryptographic module to employ the at least one cryptographic key to perform the cryptographic operation on the data associated with the at least one privileged action; and
            if memory storing at least an inactive portion of the guest OS image associated with the trapped at least one privileged action is determined to be dirty, encrypting the at least inactive portion of the guest OS image stored in memory, wherein the hypervisor stores the at least encrypted inactive portion of the guest OS image.

9. The network device of claim 8, wherein the cryptographic operation further comprises:
if the cryptographic operation includes a write operation, performing further actions, including:
receiving at least one write buffer with data from the at least one hypervisor;
encrypting the data of the at least one write buffer; and
providing the encrypted data to the at least one hypervisor.

10. The network device of claim 8, wherein the cryptographic operation further comprises:
if the cryptographic operation is a read operation, performing further actions, including:
receiving at least one read buffer that includes encrypted data from the at least one hypervisor;
decrypting at least a portion of the encrypted data in the read buffer; and
providing at least the decrypted portion of the encrypted data to the at least one hypervisor.

11. The network device of claim 8, wherein employing the at least one hypervisor to trap at least one privileged action further comprises at least one of trapping at least one read memory fault, or detecting at least a release of at least one portion of inactive memory.

12. The network device of claim 8, wherein employing the at least one hypervisor to trap the at least one privileged action further comprises:
if the at least one hypervisor is de-scheduling the at least one guest OS image, performing further actions, including:
employing the at least one hypervisor to collect at least a portion of the context information corresponding to the at least one guest OS image; and
employing the at least one cryptographic module to encrypt the at least portion of the context information corresponding to the at least one guest OS image.

13. The network device of claim 8, wherein employing the at least one hypervisor to trap the at least one privileged action further comprises:
if the at least one hypervisor is scheduling the at least one guest OS image, performing further actions, including:
employing the at least one hypervisor to retrieve at least the portion of the context information corresponding to the at least one guest OS image, wherein the at least portion of the context information is encrypted;
employing the at least one cryptographic module to decrypt at least the portion of the context information corresponding to the at least one guest OS image; and
employing the at least one hypervisor to restore the at least one guest OS image to an operative state based on at least the decrypted portion of the context information corresponding to the at least one guest image.

14. The network device of claim 8, further comprising:
employing the at least one cryptographic module to encrypt at least one activated guest OS image if the at least one activated guest OS image is at least a protected guest OS image.

15. A processor readable non-transitory storage media that includes executable instructions for protecting a guest operating system (OS) image within a virtualized computing environment, wherein a processor component that is operative to execute the instructions enables actions, comprising:
employing at least one hypervisor to trap at least one privileged action associated with each guest OS image; and
if a guest OS image associated with the trapped at least one privileged action is also designated for protection, performing further actions, comprising:
if at least one cryptographic key is absent for performing a cryptographic operation on data associated with the at least one privileged action, retrieving the at least one cryptographic key from at least one remotely located cryptographic service provider;
storing the at least one cryptographic key in at least one cache;
if at least one cryptographic module is operative to perform the cryptographic operation on the data associated with the at least one privileged action and also the cryptographic operation is valid, enabling a cryptographic module to employ the at least one cryptographic key to perform the cryptographic operation on the data associated with the at least one privileged action; and
if memory storing at least an inactive portion of the guest OS image associated with the trapped at least one privileged action is determined to be dirty, encrypting the at least inactive portion of the guest OS image stored in memory, wherein the hypervisor stores the at least encrypted inactive portion of the guest OS image.

16. The media of claim 15, wherein the cryptographic operation further comprises:
if the cryptographic operation includes a write operation, performing further actions, including:
receiving at least one write buffer with data from the at least one hypervisor;
encrypting the data of the at least one write buffer; and
providing the encrypted data to the at least one hypervisor.

17. The media of claim 15, wherein the at least one cryptographic operation further comprises:
if the cryptographic operation is a read operation, performing further actions, including:
receiving at least one read buffer that includes encrypted data from the at least one hypervisor;
decrypting at least a portion of the encrypted data in the read buffer; and
providing at least the decrypted portion of the encrypted data to the at least one hypervisor.

18. The media of claim 15, wherein employing the at least one hypervisor to trap the at least one privileged action, further comprises, at least one of trapping at least one read memory fault, or detecting at least a release of at least one portion of inactive memory.

19. The media of claim 15, wherein employing the at least one hypervisor to trap the at least one privileged action further comprises:
if the at least one hypervisor is de-scheduling the at least one guest OS image, performing further actions, including:
employing the at least one hypervisor to collect at least a portion of the context information corresponding to the at least one guest OS image; and
employing the at least one cryptographic module to encrypt the at least portion of the context information corresponding to the at least one guest OS image.

20. The media of claim 15, wherein employing the at least one hypervisor to trap the at least one privileged action further comprises the actions of:
if the at least one hypervisor is scheduling the at least one guest OS image, performing further actions, including:

employing the at least one hypervisor to retrieve at least the portion of the context information corresponding to the at least one guest OS image, wherein the at least portion of the context information is encrypted;

employing the at least one cryptographic module to decrypt at least the portion of the context information corresponding to the at least one guest OS image; and employing the at least one hypervisor to restore the at least one guest OS image to an operative state based on at least the decrypted portion of the context information corresponding to the at least one guest image.

21. The media of claim 15, further comprising the actions of:

employing the at least one cryptographic module to encrypt at least one activated guest OS image if the at least one activated guest OS image is at least a protected guest OS image.

* * * * *